UNITED STATES PATENT OFFICE.

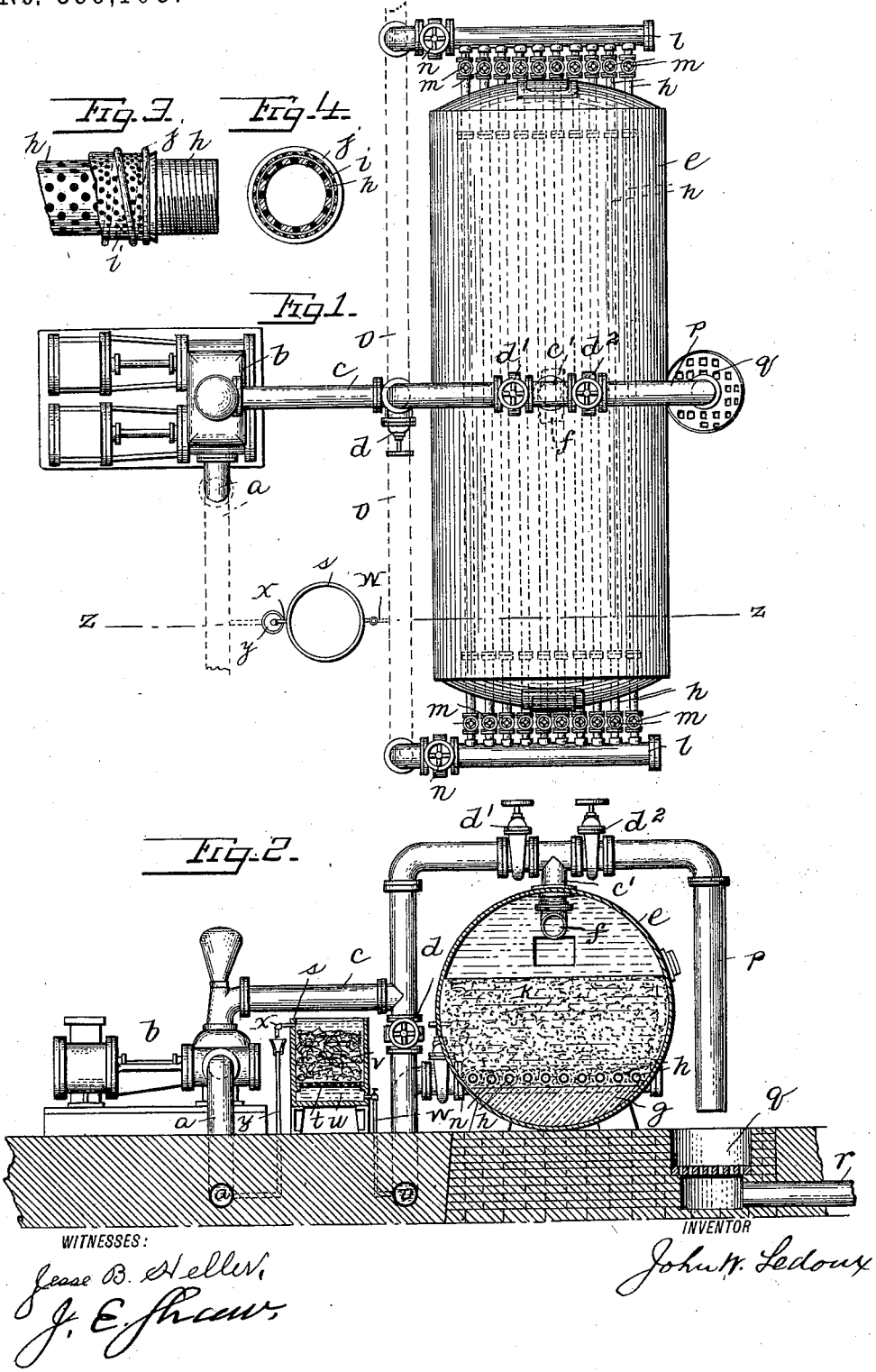

JOHN W. LEDOUX, OF SWARTHMORE, PENNSYLVANIA, ASSIGNOR TO ROBT. WETHERILL & CO., OF CHESTER, PENNSYLVANIA.

WATER-FILTERING APPARATUS.

SPECIFICATION forming part of Letters Patent No. 599,103, dated February 15, 1898.

Application filed July 20, 1897. Serial No. 645,282. (No model.)

*To all whom it may concern:*

Be it known that I, JOHN W. LEDOUX, a citizen of the United States, residing at Swarthmore, in the county of Delaware, State of Pennsylvania, have invented a new and useful Improvement in Water-Filtering Apparatus, of which invention the following is a specification.

My invention relates to the construction and arrangement of the coagulant-tank; to the filtering vessel; also, to the independently-controlled perforated pipes used for conveying the filtered water away from the filtering vessel; also, to the device employed as a bottom for supporting said perforated pipes within said vessel.

In the annexed drawings, Figure 1 is a plan of the filtering plant. Fig. 2 is a vertical cross-sectional elevation of the same on line $zz$ of Fig. 1; Fig. 3, an enlarged detail showing in elevation a portion of the perforated pipes $h$, perforated sheathing $i$, and fastening-wire $j$; Fig. 4, a vertical cross-section of the same.

Similar letters of reference are used to denote similar parts in the several figures.

$a$ represents a suction-pipe for conveying water from a river or other source of unfiltered water to pump $b$, which may be a suction and force pump of any approved pattern; $c\ c'$, pipes for carrying the water from the pump into the filtering vessel $e$; $d\ d'\ d^2$, valves controlling said pipes; $f$, a short pipe, open at each end, for directing the water toward the ends of the filtering vessel $e$; $g$, a bottom for supporting the perforated iron pipes $h$. Bottom $g$ may consist of cement or concrete or of masonry or of broken stone or brick cemented on top, so as to form an impervious flat indestructible support for said pipes $h$. The pipes $h$ are covered with perforated sheathing $i$, (see Fig. 3,) the perforations in which are of a size to prevent the passage of sand from the filtering vessel $e$. $j$ is a brass wire wound spirally around sheathing $i$, to which sheathing the wire $j$ is soldered or otherwise fastened, preferably at some point in each revolution of the wire, for the purpose of securing sheathing $i$ in position; $k$, sand or other filtering-matter resting on pipes $h$; $l$, manifolds; $m$, valves for controlling pipes $h$ independently outside the filtering vessel $e$, thus rendering it easy to use at one time all or any less number, as desired, of said pipes $h$ in the filtering or the washing operations; $n$, valves for controlling manifolds $l$; $o$, a pipe for conveying water to the elevated reservoir, (reservoir not shown;) $p$, a pipe brought into use in the operation of washing the filtering materials, this pipe being controlled by a valve $d^2$; $q$, a basin connected with a sewer by pipe $r$.

$s$ represents a tank provided with a perforated false bottom $t$, also with a chamber $u$ beneath the false bottom, also with rock alum or other coagulant $v$, which rests on said bottom, also with a water-inlet valve-controlled pipe $w$, which connects chamber $u$ with the reservoir-pipe $o$, also with an overflow-pipe $x$, situated at or near the top of tank $s$ and adapted to discharge the coagulant water into pipe $y$, which is connected with the suction-pipe $a$ of the pump. Pipe $y$ may, however, be arranged to discharge into a reservoir of unfiltered water or into a conduit supplying such a reservoir with unfiltered water; but in any case I prefer that the coagulant water enter the unfiltered water before the latter enters the pump.

The coagulant-tank $s$ is open at the top. It is arranged on the floor or platform upon which the pump and filtering vessel rest, with the view of rendering it readily accessible for regulating the inflow of water through pipe $w$ and for observing and from time to time testing the strength of the coagulant-bearing water, the overflow-pipe $x$ being broken off, as indicated, to admit of the measurement at will of the coagulant water discharging into the open mouth of pipe $y$. The tank $s$ may be located at any point between the suction-pipe $a$ and the elevated reservoir, but is preferably located, as shown, where it has the shortest connection on one hand with the supply of unfiltered water passing into the pump and on the other hand with the reservoir-pipe $o$.

The operation of the apparatus is as follows: The water passing through the tank $s$ dissolves and carries with it through the overflow-pipe $x$ more or less of the coagulant into the open mouth of the vertical pipe $y$, thence passing into the suction-pipe $a$, where it mingles with the unfiltered water passing into the pump and produces coagulation of foreign matters in the water. Pump $b$ forces the water through pipes $c\ c'$ (valve $d'$ having been first opened and valves $d\ d^2$ closed) into the filtering vessel $e$, toward the ends of which it is directed by pipe $f$ and passing down through the sand or other filtering materials $k$ into the perforated pipes $h$ flows thence into the manifolds $l$ and thence through the pipe $o$ to the elevated reservoir.

In order to wash the sand or other filtering materials, valve $d'$ is closed, valves $d^2$, $m$, and $n$ opened, and the water allowed to pass from the reservoir-pipe $o$ into the manifolds $l$, thence by pipes $h$ into the filtering vessel $e$, and up through the sand or other filtering materials $k$, carrying all dirt and scum out through pipe $p$ to the basin $q$, whence it is carried by pipe $r$ to a sewer.

The coagulant-tank constructed and arranged in relation to the pump as described is sometimes operative alone or in conjunction with a settling-reservoir to purify the water without the use of the filtering portion of the plant. In such cases the cost of the plant may be lessened by omitting the filtering vessel, its appurtenances, and connecting-pipes.

I claim—

1. In a water-filter the combination of a tank provided with a perforated false bottom, a chamber beneath said bottom, a coagulant supported by said bottom, a valve-controlled water-inlet pipe connecting the aforesaid chamber with the elevated reservoir-pipe, an overflow-pipe discharging the coagulant water from said tank by broken pipe connection into the unfiltered water before this water enters the pump, a pump and a conduit leading from the pump into the elevated reservoir-pipe, substantially as and for the purpose set forth.

2. In a water-filter, the combination of the open tank $s$, perforated bottom $t$, chamber $u$, coagulant $v$, reservoir-pipe $o$, valve-controlled water-inlet pipe $w$, overflow-pipe $x$, receiving and connecting pipe $y$, suction-pipe $a$, pump $b$, and the pipe $c$ emptying into the elevated reservoir-pipe $o$, substantially as and for the purpose set forth.

3. In a water-filter, the tank $s$, perforated false bottom $t$, chamber $u$, coagulant $v$, reservoir-pipe $o$, valve-controlled water-inlet pipe $w$, overflow-pipe $x$, emptying by a broken connection into pipe $y$, suction-pipe $a$, pump $b$, pipes $c$, and $c'$, valves $d$, $d'$, $d^2$ in combination with the filtering vessel $e$, filtering materials $k$, perforated pipes $h$, severally provided with the perforated sheathing $i$, and with the spiral wire $j$, bed $g$, valves $m$, located outside the filtering vessel, manifolds $l$, valves $n$ and the reservoir-pipe $o$, substantially as and for the purposes set forth.

JOHN W. LEDOUX.

Witnesses:
J. E. SHAW,
JOS. B. WILLITS.